Figure 1:
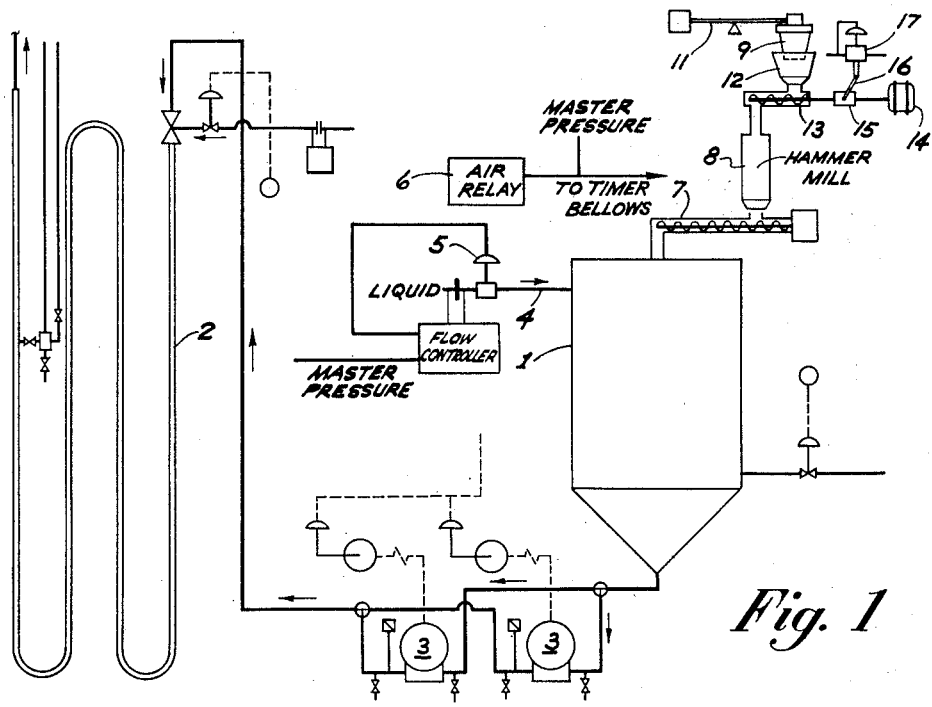

INVENTORS
EUGENE H. C. BROWN & IRVING LEFKOWITZ
BY Arthur Robert
ATTORNEY

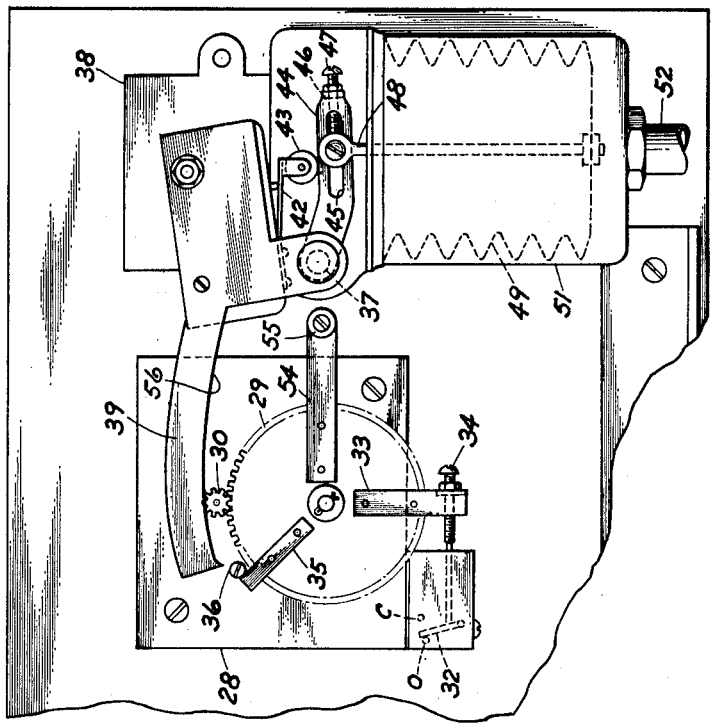
Fig. 2
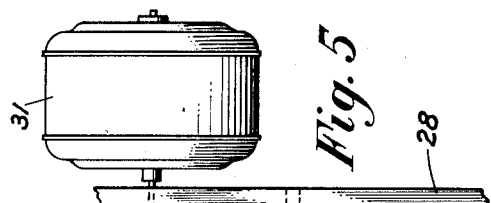
Fig. 3
Fig. 5
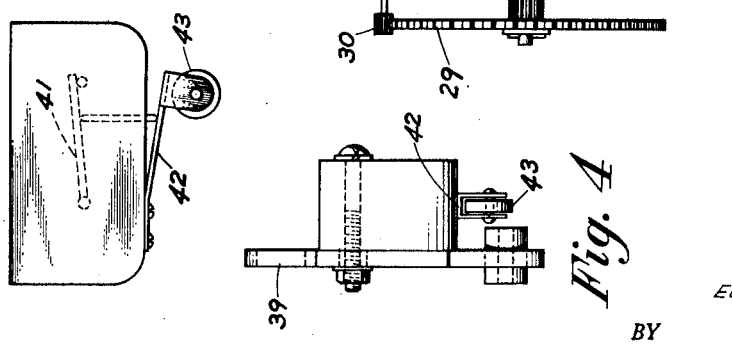
Fig. 4
INVENTORS
EUGENE H.C. BROWN &
IRVING LEFKOWITZ
BY
Arthur Robert
ATTORNEY Inventors
EUGENE H.C. BROWN & IRVING LEFKOWITZ
By Arthur Robert
Attorney

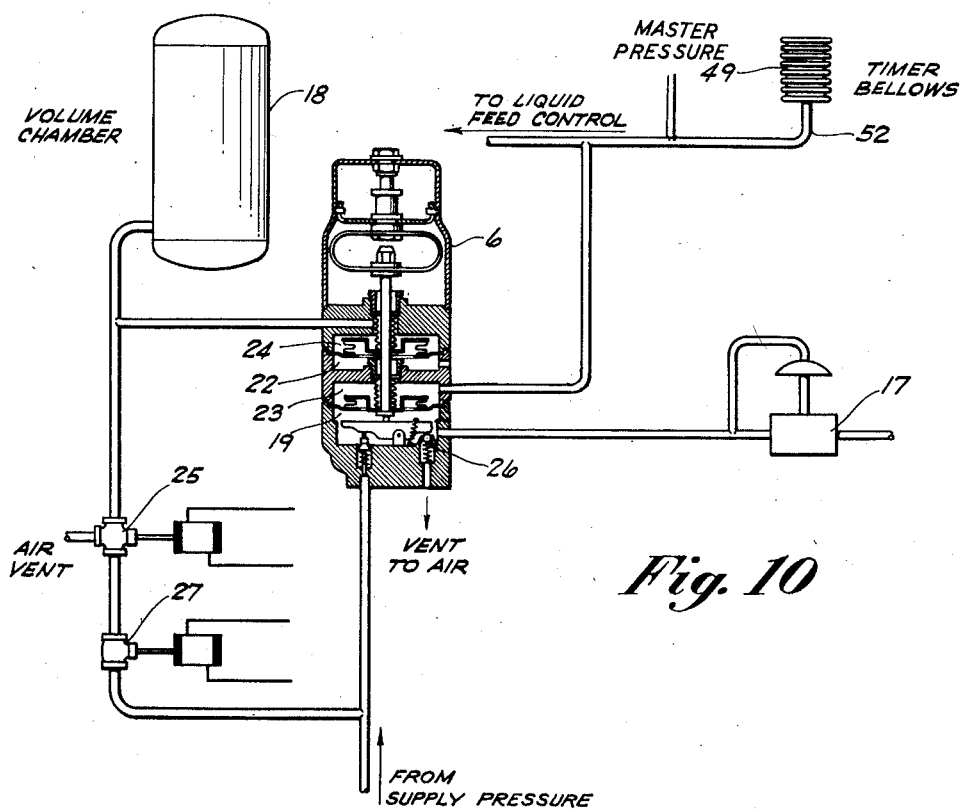

Patented June 9, 1953

2,641,316

UNITED STATES PATENT OFFICE 2,641,316

RECURRENT PROCESS CONTROLLER

Eugene H. C. Brown and Irving Lefkowitz, Louisville, Ky., assignors to Joseph E. Seagram & Sons, Inc., Louisville, Ky., a corporation of Indiana Application February 27, 1950, Serial No. 146,564

1 Claim. (Cl. 161—1)

This invention relates to a control apparatus for automatically correlating and correcting an intermittent or cyclically recurring operation with a continuous operation. The invention finds one application in the continuous process of cooking grain for making alcohol, in which connection it will be described, but the invention is not limited thereto.

In the continuous process of cooking grain, the water, and other liquid ingredients are supplied to the cooker in a continuous flow, but as Government regulations require that the grain be weighed out in batches, difficulty is encountered in maintaining the proper proportion of grain to liquids in the cooker. The cooking step is followed by a fermenting step carried out in batch fermenters, and a failure to continuously maintain the proper ratio of grain to liquids in the cooker may result in the fermenters receiving incorrectly proportioned batches, which may in turn result in a low alcohol yield from those fermenters by reason of incomplete fermentation. A low yield in the fermenters may result whether the proportion of grain to liquid is below or above the optimum proportion.

A known type of automatic scale used for weighing batches of grain consists of a scale receiver into which the grain is weighed, a bin or hopper into which the batches of grain are dumped from the receiver, and a conveyor for carrying away the grain. The scale receiver is aranged so that when the scale dumps, the flow of grain from the scale receiver into the hopper is retarded by the reserve grain in the hopper, and the scale cannot rise to be reloaded until the scale receiver is emptied. The cycle of operation of the scale, therefore, is controlled by the speed of the conveyor which carries away the grain from the hopper, up to the maximum weighing rate of the scale. Because the rate at which grain is carried away from the hopper by the conveyor depends on a number of variables, including the level of grain in the hopper, which varies considerably, a fixed speed setting of the conveyor will not prevent variation in proportion of the grain fed to the cooker. Variations in proportion become cumulative, and compensation for a grain deficiency introduced after too long a time will produce an excess proportion of grain, which has the same disadvantage as a deficiency. Furthermore, when the rate of liquid feed is changed to operate the cooker at a different rate, the problem of setting the scale cycle by the operating speed of the conveyor again arises.

Accordingly, it is an object of the present invention to provide an apparatus for automatically introducing a periodic correction in the control of an intermittent operation in a continuous process, so as to maintain the intermittent operation in a predetermined relation to the continuous process.

Another object of the present invention is to correlate an intermittent operation with a continuous operation to limit deviation of the intermittent operation from a mean or average value.

Another object is the provision of a control apparatus for maintaining a proper or predetermined ratio between a continuous flow of one material and an intermittent variable flow of another material under variable rates of flow of the one material.

Another object is the provision of a control apparatus for a continuous grain cooker which automatically maintains a predetermined ratio between the fluid flow to the cooker and the intermittent grain supply to the cooker.

Another object is the provision in a fluid pressure controlled system having a continuous flow varied by changing of fluid pressure and an intermittent flow varied by changing of fluid pressure, of a timer for governing the intermittent flow in substantially direct proportion to changes in continuous flow control pressure.

Another object is the provision of a timer having a switch positioned by a variable wherein a nonlineal predetermined relationship is maintained between time and the variable.

Another object is the provision of a timer having a time cycle which is adjusted inversely in proportion to the square root of a variable.

According to one feature of the present invention, there is provided a timer which embodies a resolving mechanism that makes the cycle thereof vary in proportion to the square root of a variable. This resolving mechanism comprises a square root cam, or square root mechanical movement or other mechanism operated in conjunction with the variable for converting the cycle time of the timer to a square root relationship. The timer may be employed to control a cyclically or intermittently operated apparatus by any suitable means so as to change the operating cycle of said apparatus proportionally to the square root of said variable. For example, where the variable is fluid pressure, the change in cycle time may be made proportional to the square root of the fluid pressure, or may be made proportional to the square root of the reciprocal of the fluid pressure, depending upon the direction in which the fluid pressure acts on the resolving mechanism.

According to another feature of the present invention, the operation of an intermittently or cyclically operated apparatus is maintained in a predetermined relationship to said variable (whether a direct, a square root, or some other relationship is desired) in spite of the occurrences of ambient conditions tending to change the operation thereof, by a timer in cooperation with a correcting mechanism acting to apply a correction at each cycle of the intermittently operating apparatus to be controlled. Thus, when the timer and apparatus to be controlled fall out of synchronism an accelerating or retarding correction is applied at each cycle as required to maintain the starting of the timer cycle and the cycle of the apparatus to be controlled in synchronism.

The invention may be applied to a remotely controlled cooker in which the flow of liquids to the cooker is predetermined or set by any desired pneumatic or hydraulic master pressure control system, in conjunction with an automatic batch weighing scale as above described in which the speed of the hopper conveyor is controlled by the timer of the present invention through any suitable control mechanism. The master control pressure is correlated to the desired rate of operation or flow through the cooker, the flow of liquids to the cooker corresponding to the square root of the master control pressure. In order to proportionately vary the rate of feed of grain by the scale, it is necessary to vary the time between dumps. In the present embodiment the timer which controls the time between dumps is set by the master control pressure applied to the timer through a resolving mechanism to produce a time cycle proportional to the inverse square root of the change of the master control pressure, and thus a direct proportional relationship between the grain feed and liquid feed to the cooker is maintained at any value of the master pressure.

The variation in time between dumps is accomplished by changing the speed of the conveyor that removes grain from the hopper. For example, where the conveyor is driven by a constant speed motor through a variable speed drive, the drive may be adjusted by any suitable electrical or electro-pneumatic control operated by the timer. In one preferred embodiment this adjustment of the drive is made by an air motor positioned by electric-pneumatic relays operating with an air relay of known construction supplied by the master pressure, so that the pressure supplied to the air motor will be changed by the master pressure, thereby reducing the amount of correcting action required by the timer. However, various other mechanisms and arrangements may be employed to secure the desired correction.

The timer applies the required compensation or correction at each cycle of the scale. For this purpose the timer and scale mechanism are set to begin their operating cycles in synchronism, and a mechanism is provided which applied to the scale an accelerating compensation when the timer completes its cycle ahead of the scale, and a retarding compensation when the scale completes its cycle ahead of the timer. When the grain feed and liquid flow are properly coordinated, the timer cycle and scale cycle end substantially simultaneously. Because of the correcting action of the timer it is not necessary that the speed varying mechanism for the conveyor be inherently designed for correlating the grain flow proportional to the liquid flow, because the action of the timer brings about the proper correlation and also acts to compensate for ambient conditions affecting the rate of grain feed.

Figure 7:
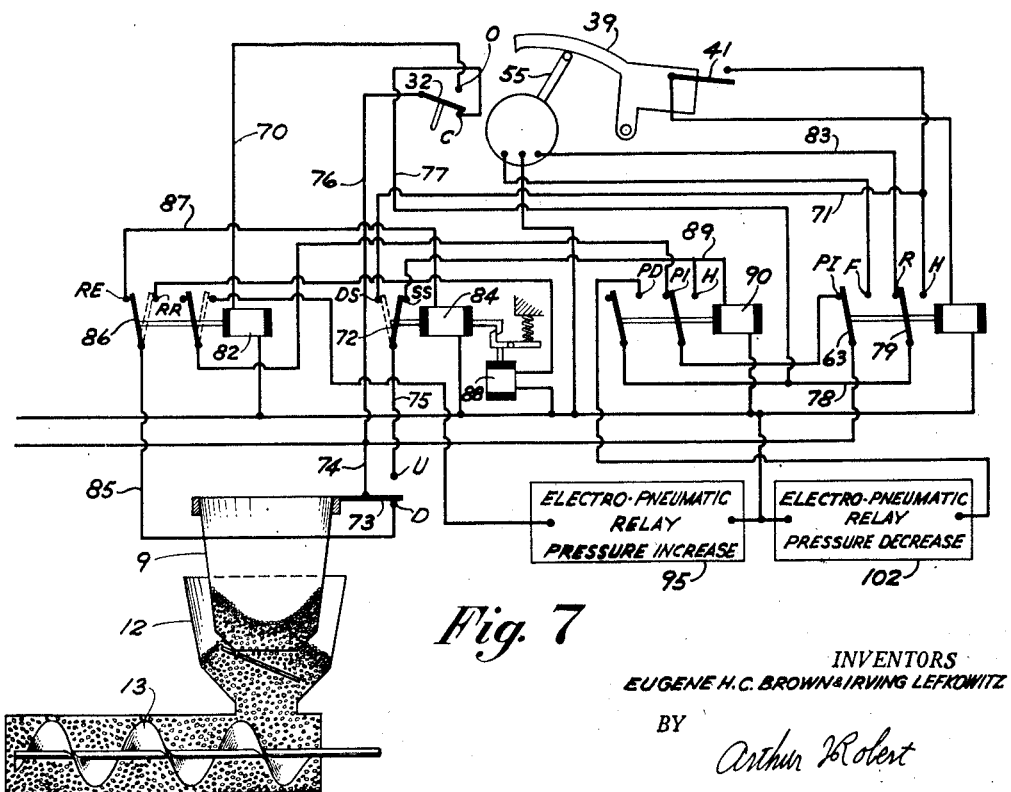
Figure 6:
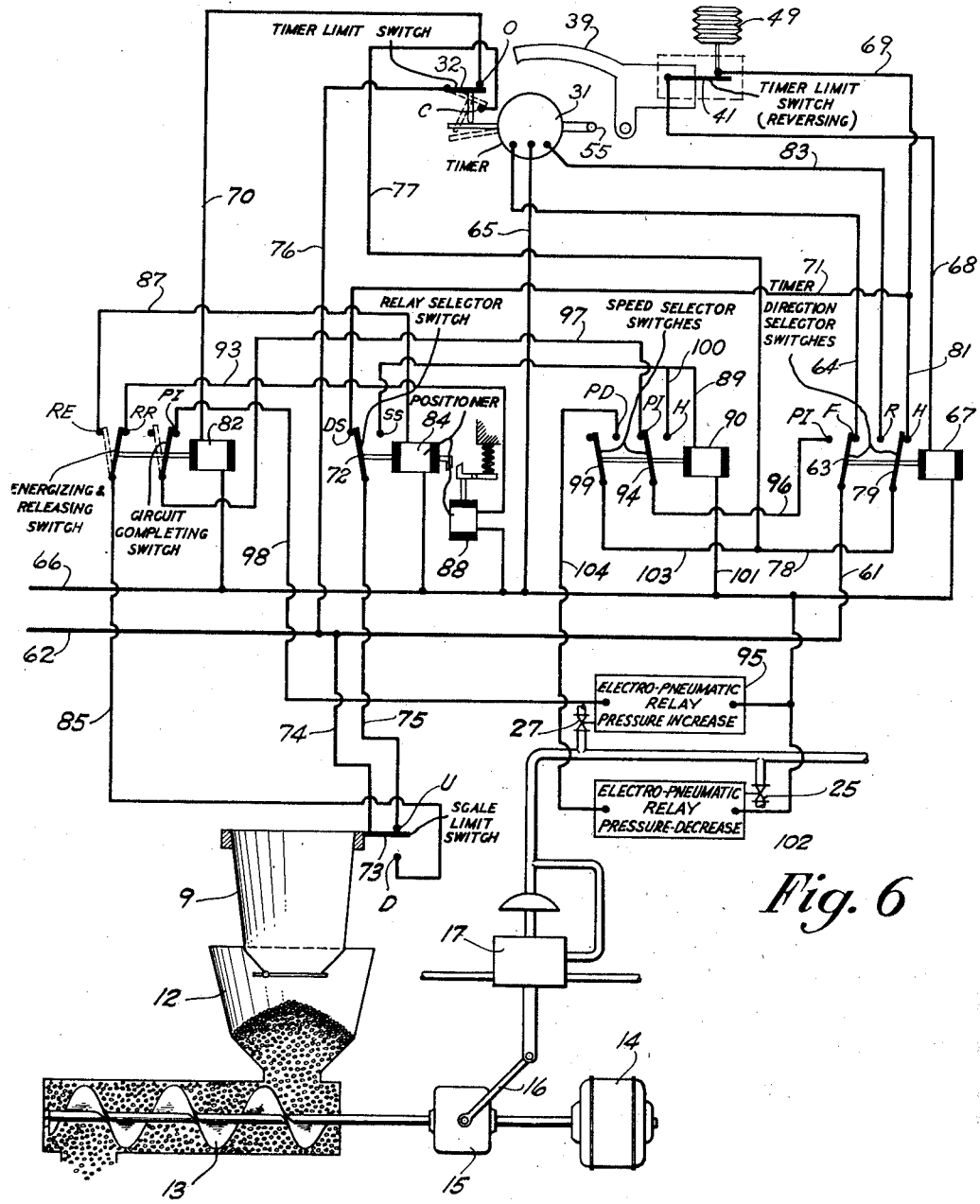
Figure 8:
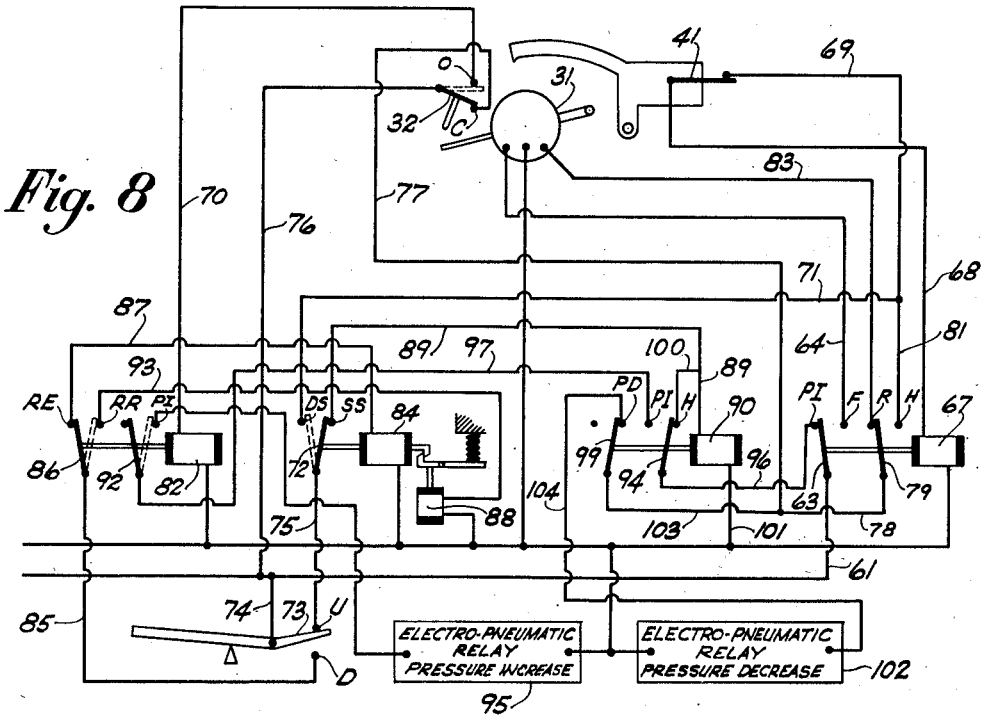
Figure 9:
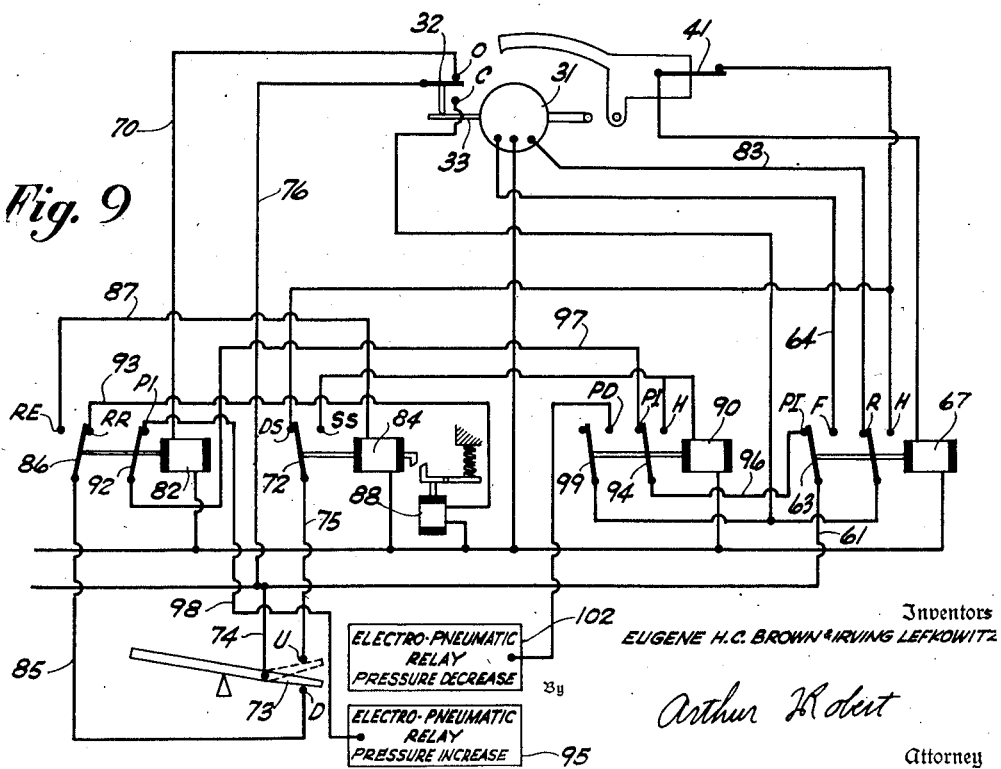

The invention will be described in greater detail in connection with the accompanying drawings illustrating a preferred embodiment of the invention by way of example, and wherein:

Figure 1 is a diagrammatic view illustrating an apparatus for carrying out the continuous grain cooking process, Figure 2 is an elevation of a timer, Figure 3 is a partly schematic side view of the reversing controller, Figure 4 is an end view of a detail of Figure 2, Figure 5 is a fragmentary end view of a detail, Figure 6 is a diagrammatic view explaining the operation of the timer, scale and conveyor drive and their cooperating electrical and fluid pressure circuits, Figures 7, 8 and 9 are wiring diagrams to explain the operation of the invention, and Figure 10 is a schematic view of the pneumatic control system.

Cooker system

Referring to the drawing, Figure 1, there is shown a precooker 1 supplied with a mixture of ground grain and liquid, e. g. water and stillage. The heated mash is pumped to a continuous cooker 2 by pumps 3 controlled by a level controller (not shown) in the precooker which operates suitable controllers for the pumps. The cooked grain mash is discharged from the continuous cooker 2 into batch fermenters (not shown). Liquid is supplied to precooker 1 through conduit 4, the rate of flow of liquid being indicated by any suitable indicating apparatus (not shown). The air motor 5 which controls the rate of flow of liquid is positioned by a flow controller which responds to the master pressure. The master pressure is also applied to a control air relay 6. The rate of flow of liquid to the precooker can be set at any desired value by setting the master pressure at the corresponding value, the liquid flow rate being proportional to the square root of the master pressure.

Ground grain is supplied to the precooker in a continuous flow by a screw conveyor 7, which in turn receives its supply from the hammer mill 8. A receiver 9 (Figures 1 and 7) on a weighing scale 11 is supplied with whole grain, and when receiver 9 is loaded with a predetermined weight of grain, the scale beam drops and the bottom of the receiver opens to discharge the grain into hopper 12, from which a screw conveyor 13 carries away the grain to the hammer mill 8. The discharge of ground grain from the hammer mill into screw conveyor 7 is substantially continuous and equal to the feed thereto, so that the flow of grain to the precooker is in effect, governed by the conveyor 13. Grain will flow from receiver 9 in dumping position only as fast as allowed by depletion of the supply of grain in hopper 12, and the scale beam carrying the receiver will rise for refilling only after the batch of grain is completely discharged from the receiver. Conveyor 13 is driven by a motor 14 through a variable speed drive mechanism 15 which is varied by means of a lever 16 and air motor 17 so that an increase in air pressure on the air motor increases the speed of the conveyor, and a decrease in air pressure decreases the speed of the conveyor.

Pneumatic control system

The entire pneumatic system for controlling the continuous and intermittent operations of the process is diagrammatically illustrated in Figure 10, wherein the air relay 6 is of known construction (commercially known as the "Standatrol" of the Bailey Meter Company). Air pressure in chamber 19 is employed to position the air motor 17. The master pressure is applied to chamber 23 and remains constant for a given rate of liquid flow to the precooker. The pressure in chamber 19 responds to changes in pressure in chamber 23 or 24; and the volume chamber 18 connected to chamber 24 provides an increased capacity for this chamber so as to reduce the rate of pressure change in chamber 24 upon flow of air from or into this chamber. If the loading pressure to chamber 24 decreases below the spring loading, as by opening of bleed valve 25, the exhaust valve 26 in chamber 19 will open to decrease the pressure therein an equal amount, and this decrease is transmitted to the air motor 17 to reduce the speed of the conveyor 13. However, this reduction in speed of the conveyor is not correlated to the liquid feed to the cooker. A similar but reverse action occurs when valve 27 opens to introduce air from a pressure source to increase the pressure in chamber 24. Thus, by varying the pressure in chamber 24, the pressure in chamber 19 may be made to assume any value from zero up to the supply pressure. The pressure in chamber 19 is equal to the sum of the pressures in chambers 23 and 24, less the tension on the spring. Any change in setting of the master pressure will automatically produce a change in pressure in chamber 19, which acts upon the conveyor, but as above pointed out, the change in speed of the conveyor is not correlated to the liquid feed to the cooker.

Assuming the screw conveyor 13 were operated at a uniform speed, various ambient conditions such as the variation in level of the grain in bin or hopper 12, variations in the size of the grain, or other conditions encountered in service, would cause a variation in the rate of feed of the conveyor. Furthermore, a change in air pressure in chamber 19 produced by changing the master pressure to set a different flow rate of liquid to the precooker would, if communicated by air motor 17 to variable drive 15, result in a change in speed of the conveyor 13 in the proper direction but not correlated to the liquid flow to the precooker. The apparatus for maintaining this required correlation now will be described.

Timer

Referring to Figure 2, a panel carries a bracket 28 upon which a gear wheel 29 is suitably mounted for rotation. As illustrated, gear wheel 29 is engaged by a pinion 30, driven by an electric motor 31 of any suitable type, although it will be understood any desired arrangement can be provided for rotating this wheel 29 from the motor. Bracket 28 carries a limit switch member 32, which preferably is a "microswitch" of the two contact spring biased plunger type, the two contacts being designated by the letters O and C. An arm 33 secured on the gear wheel 29 carries an adjustment screw 34 adapted to engage the switch plunger to operate the switch 32. A second arm 35 on the gear wheel cooperates with a stop 36 on the bracket to limit clockwise rotation of the gear wheel and of arm 33. The position of switch 32 is fixed, although screw 34 admits of fine adjustment to coordinate the switch operation with the stop position.

A shaft 37 extending from bellows assembly 38 carries a cam member 39 pivoted thereon. A switch housing is adjustably fastened to the cam member and contains a limit or reversing controller switch 41 (Figure 3) having a pivoted operating arm 42 carrying a roller 43. Upon pivoting of cam 39 clockwise arm 44 is engaged by the switch operating roller 43 for opening the switch, the switch being biased to closed position by a spring in known manner. A stop (not shown) may be provided to limit pivotal movement of cam member 39 in counterclockwise direction. Arm 44 is swiveled on shaft 37 and has a slot 45 to receive a sliding block. The arm is bent over at 46 to receive an adjustment screw 47 engaging the block. An operating rod 48 secured in the block at one end, has its opposite end secured to a diaphragm or bellows 49 in the pressuretight housing 51, and the pressure on the bellows is varied through an air pressure connection 52 in the housing connected to the air line controlling the liquid for the precooker.

Wheel 29 carries a third arm 54 having a contact roller 55 near its end. The edge 56 of cam member 39 is of a special configuration, the derivation of which will be later described. When the counterclockwise rotation of wheel 29 carries roller 55 into engagement with cam edge 56, the cam member 39 and switch housing thereon are rocked clockwise to bring roller 43 against the top edge of arm 44, thereby moving arm 42 to open the switch 41. This reverses the timer motor, as will hereinafter appear, and the timer then returns to starting position.

It will be observed that the position of switch engaging stop 44 is variable in response to the position of rod 48, and the distance between switch engaging stop 44 and switch operating roller 43 varies inversely as the master pressure in bellows 49, this distance being directly proportional or equal to the time. The edge 56 of the cam is formed so that in its various angular positions, the distance which the roller 55 travels from zero position to actuate the switch 41 and return to zero position, or the time of such travel, is proportional to the square root of the inverse of the movement of rod 48. The timer cycle thus becomes proportional to the square root of the inverse pressure, and is therefore directly proportional to the flow of liquid to the precooker. In addition, in the modification shown, the cam edge is formed to compensate for the angularity of lever 44 at various positions in relation to the movement of rod 48, and for the angular relation of arm 54 to the cam edge 56. The shape of cam edge 56 may be computed mathematically, or may be laid out by trial and error.

It will be understood that by arranging the bellows 49 to increase the distance between stop 44 and roller 43 with increase in pressure, and properly shaping the timer cam edge 56, the timer cycle may be made directly proportional to the square root of the pressure. Any desired relation between the timer cycle and the pressure may be provided by suitably shaping the cam. Also, if desired, the cam may be carried on or be positioned by bellows 49.

Electrical circuits

The various electrical circuits and the pneumatic control system for the conveyor are diagrammatically shown in Figures 6 to 9, corresponding parts being indicated by like reference numerals. Figure 6 shows in full lines, the positions of the various switches and relays when the timer and scale are ready to start their respective cycles in synchronism. The forward or counterclockwise operating circuit of the timer motor 31 comprises lead 61 connected between main 62 and forward direction selector switch 63, lead 64 from terminal F (forward) to the motor 31, and common return lead 65 to main 66. The switch 63 is held in contact with terminal F by a direction selector relay or solenoid 67 connected by lead 68 to timer limit switch 41, and by leads 69, 71 to one terminal DS (direction selector) of a relay selector switch 72. When the scale receiver 9 is in up or filling position as shown in Figure 6, its limit switch 73 engages the up terminal U, so that in this position solenoid 67 is energized through the circuit comprising lead 74, switch 73 in the U position, lead 75, switch 72, leads 71, 69, switch 41 and lead 68, to position switch 63 for energizing the forward operating circuit of motor 31.

The filling of the scale receiver 9 commences, and the motor 31 starts its forward movement, moving timer limit switch 32 to the C contact as shown in dotted lines in Figure 6. In this position operating relay or solenoid 82 is deenergized by opening of the O contact of switch 32, its circuit comprising lead 76, switch 32 and lead 70. When the scale dumps, the opening of scale contact U does not deenergize the direction selector relay 67, because movement of switch 32 to the C contact closes a holding circuit for solenoid 67, comprising lead 76, switch 32 in the C position, leads 77, 78, timer reverse circuit switch 79 in the H position, leads 81, 69, switch 41 and lead 68. The timer continues its forward phase until roller 55 engages cam 39 to open switch 41, as shown in Figure 7, thus opening the holding circuit of solenoid 67 to shift forward switch 63 to the PI (pressure increase) contact, and at the same time moving reverse switch 79 to the R (reverse) contact to close the timer reverse circuit. This reverse circuit comprises lead 76, switch 32 in C position, leads 77, 78, switch 79 in the R position, and lead 83, and energization of the reverse circuit causes the timer motor to start its return movement toward the zero position. The shifting of switch 79 from the H position prevents reenergizing of solenoid 67 when switch 41 closes upon disengagement of roller 55 from cam 39 on the return phase of the timer.

Engagement of the contact D (down) by scale limit switch 73 closes the energizing circuit of solenoid 84 of the relay selector switch positioner, which circuit comprises lead 74, switch 73, lead 85, relay energizing and releasing switch 86 in the RE (relay energizing) position, and lead 87. This moves switch 72 to engage the SS (speed selector) contact and switch 72 is locked in this position by the mechanical interlock of solenoids 84 and 88. The dropping of the scale beam causes opening of the scale receiver by a suitable tripping device (not shown) and the contents of the receiver flow out as fast as the conveyor 13 removes the grain from the hopper 12. While the scale container is emptying the switch 72 is held againts the contact SS, but because the U contact is open no current flows across switch 72 by lead 89 to speed selector relay or solenoid 90.

Three conditions of operation are possible: (a) The timer can complete its cycle before the scale; (b) the timer can complete its cycle after the scale; or (c) the timer and scale may complete their cycles substantially simultaneously. These conditions will be described in the order enumerated.

*Timer cycle completed before scale cycle*

Referring to Figure 9, the timer has completed its cycle and arm 33 has moved switch 32 to the O contact to deenergize the reverse circuit of motor 31, thereby stopping the motor, and to close the energizing circuit of solenoid 82, to move switch 86 to the contact RR (relay release) and move circuit closing switch 92 to the closed position. With the scale in down position as shown, switch 86 completes the energizing circuit of solenoid 88, comprising lead 74, switch 73, lead 85, switch 86 in the RR position and lead 93, thereby releasing switch 72 to the DS position. That is, switch 72 was held in the SS position for the time interval between dumping of the scale and return of the timer to zero position. An accelerating compensation for the scale cycle now is introduced as follows:

Deenergization of solenoid 67 has placed switch 63 in series with speed selector switch 94 in the PI (pressure increase) position and with circuit completing switch 92 in the PI position, the circuit of the pressure increase accelerating relay 95 is energized through lead 61, switch 63, lead 96, speed selector switch 94, lead 97, switch 92 in the PI position, and lead 98. This opens valve 27 (Figures 6 and 10) to admit additional air from a pressure source to air motor 17 which operates lever 16 of the variable gear drive 15 to increase the speed of conveyor 13 and thus hasten completion of the scale cycle. Upon completion of the scale cycle, the switch 73 rises to the U position, as shown in dotted lines in Figure 9, to energize the circuit of relay 67 through switches 72 and 41, whereupon switch 63 moves to the F contact to start the motor 31. As above described, operation of switch 32 by motor 31 to the C contact opens the circuit of solenoid 82 to allow switch 92 to open and thus deenergize the circuit of the pressure increase relay 95 which closes valve 27. This stops the speed increase correction, and the timer and scale cycles now start in unison as described in connection with Figure 6. The scale dumps and the circuit of solenoid 84 is energized so that switch 72 is locked in the SS position as previously described. The timer then opens switch 41 to commence its reverse phase.

*Scale cycle completed before timer cycle*

Upon rising of the scale to complete its cycle before the timer cycle is completed, the parts are in the positions shown in Figure 8. The engagement of scale contact U by switch 73 closes the energizing circuit of speed selector solenoid 90 comprising lead 74, switch 73, lead 75, switch 72 and lead 89, and places pressure decrease switch 99 in the PD (pressure decrease) position. Relay 90 now is energized by a holding circuit comprising lead 61, switch 63 in the PI position, lead 96, switch 94 in H position, leads 100, 89 and 101. The circuit of pressure decrease relay 102 thereupon is closed, this circuit comprising lead 76, switch 32 in the C position, leads 77, 103, switch 99 and lead 104. The pressure decrease relay opens valve 25 (Figures 6 and 10) to bleed air from the line of air motor 17 which thereupon operates lever 16 of the variable gear drive 15 to decrease the speed of conveyor 13. This decreased speed continues until timer motor 31 operates switch 32 to disengage contact C at the end of the timer cycle and open the circuit of relay 67 to stop the timer, and open the energizing circuit of the pressure decrease relay 102.

The operation of switch 32 to the O position energizes the circuit of relay 82 and moves switch 86 to the RR position, the timer in the meantime being stopped. The scale is filling again, and when the scale dumps the release relay 88 is energized to allow switch 72 to move to the DS position. When the scale rises the relay 67 is energized through switch 72 to start the timer on its forward phase. Thus the timer has remained inoperative for one scale cycle, and the starting of the next timer cycle occurs simultaneously with the start of the scale cycle.

If the scale and timer cycles are in synchronism, the timer will end its cycle substantially concurrently with the scale cycle, so that the circuit assumes the position shown in full lines in Figure 6 for starting a new cycle, without operating either electro-pneumatic relay, and no correction is imparted to the scale cycle.

Operation

The operation of the whole apparatus now will be reviewed. The master air pressure which fixes the rate of flow of liquid to the precooker 1 acts simultaneously on relay 6 and bellows 49, and determines the position of arm 44. The cam 39 resolves the angular movement of roller 55 into a relation proportional to the inverse of the square root of the movement of arm 44, so that the timer cycle is proportional to the square root of the inverse of the air pressure, and thus is directly proportional to the liquid feed to the precooker 1. Should the timer complete its cycle before the scale returns to its up position, the pressure increase electro-pneumatic relay 95 is energized to increase the pressure applied to air motor 17, and movement thereof increases the speed of conveyor 13 which shortens the scale cycle. Upon completion of the scale cycle the correction stops, and the timer and scale start their cycles in synchronism.

Should the scale cycle be completed before the timer cycle, the timer stops, and the pressure decrease electro-pneumatic relay 102 is energized to decrease the pressure applied to air motor 17, and movement thereof decreases the speed of conveyor 13 to lengthen the scale cycle. The rising of the scale stops the correction. The timer remains stopped while the scale receiver fills and dumps, and when the scale again rises, the timer and scale commence their cycles in synchronism.

We claim as our invention:

In combination with a reversible timer, and a cyclically operating apparatus to be controlled: speed control circuits for the apparatus to be controlled having speed increase and speed decrease circuit switches therein; a speed selector relay for selectively operating said switches, one of said switches being common with a holding circuit for the speed selector relay; forward and reverse circuits for said timer including direction selector switches; a direction selector relay for selectively operating said direction selector switches, one of said direction selector switches being common to the holding circuit of the speed selector relay, and the other direction selector switch being common to a holding circuit for the direction selector relay; a relay selector switch for energizing the direction selector relay in one position and the speed selector relay in the other position; limit switch means for the cyclically operating apparatus; positioning means for the relay selector switch including relay energizing and relay releasing switch connected with the limit switch means of the apparatus to be controlled when in one position, said limit switch means being connected to the relay selector switch when said apparatus is in another position; a circuit completing switch for one of the speed control circuit switches; a position operating relay for the circuit completing switch and the relay energizing and relay releasing switches; and limit switches operated by the timer, one of said timer limit switches being in the holding circuit of the direction selector relay, and the other timer limit switch being common to the circuit of said position operating relay, the holding circuit of the direction selector relay, one of the speed control switches, and the timer reverse circuit.

EUGENE H. C. BROWN.
IRVING LEFKOWITZ.

References Cited in the file of this patent

UNITED STATES PATENTS

| Number | Name | Date |
|---|---|---|
| 2,050,614 | Kerr | Aug. 11, 1936 |
| 2,218,390 | Alexander | Oct. 15, 1940 |
| 2,276,382 | Francis | Mar. 17, 1942 |
| 2,408,221 | Michel | Sept. 24, 1946 |
| 2,414,467 | Hunt | Jan. 21, 1947 |
| 2,449,953 | Rippingille | Sept. 21, 1948 |
| 2,467,181 | Barnard et al. | Apr. 12, 1949 |